United States Patent [19]
Thompson

[11] 3,803,755
[45] Apr. 16, 1974

[54] WILDLIFE CALL

[76] Inventor: Harold Thompson, P.O. Box 8002, Boise, Idaho 83707

[22] Filed: Sept. 11, 1972

[21] Appl. No.: 287,926

[52] U.S. Cl. .............................................. 46/180
[51] Int. Cl. ............................................. A63h 5/00
[58] Field of Search ...................... 46/178, 180, 181

[56] References Cited
UNITED STATES PATENTS

| | | | |
|---|---|---|---|
| 2,396,359 | 3/1946 | Yager | 46/180 |
| 3,406,479 | 10/1968 | Faulk | 46/180 |
| 2,730,836 | 1/1956 | Faulk et al. | 46/180 |

*Primary Examiner*—Louis G. Mancene
*Assistant Examiner*—Robert F. Cutting
*Attorney, Agent, or Firm*—John W. Kraft

[57] ABSTRACT

The wildlife call comprises a tapering cylindrical horn and a reed assembly including a reed cylinder being engageable with the interior of the small terminal end of the horn and being divided by a transversely disposed wall having a suitable hole, a semicircular reed block having a flat portion and a chamfer on the flat portion at one of its terminal ends, and having a rectilinearly disposed groove in the flat portion, a reed locking means and a reed. The reed locking means and reed are operable to closely, slidably engage the interior walls of the reed cylinder and to fit within the reed cylinder engaging end of the horn.

4 Claims, 6 Drawing Figures

{ 3,803,755 }

WILDLIFE CALL

FIELD OF INVENTION

The present invention relates to wildlife calls and, more particularly, to wildlife calls provided with interchangeable reeds.

DESCRIPTION OF THE PRIOR ART

Wildlife calls, commonly used and employed, include a fixed reed mounted within a substantially cylindrical horn. This type of wildlife call frequently includes a pair of reeds disposed with their broadest sides adjacent. Considerable skill is required to play this double reed call by causing both reeds to vibrate. Wildlife calls have included unreeded calls. The unreeded calls generally comprise a cylindrical horn having a mouthpiece of a configuration analogous to that of a trumpet. The wildlife sound is made by blowing into the mouthpiece, in the manner of a trumpet, and by modulating the air and lip pressures. Although the sound of unreeded calls may be more varied than with commonly known fixed reed types, more skill and practice is required.

Accordingly, it is an object of the present invention to provide a wildlife call which may be played by merely blowing into the instrument.

It is a further object of this invention to provide a wildlife call with interchangeable reeds operable to change the sounds emitted.

These and other objects shall become apparent from the description following, it being understood that modifications may be made without affecting the teachings of the invention here set out.

SUMMARY OF THE INVENTION

Generally, the wildlife call comprises a tapering cylindrical horn and a reed assembly including a reed cylinder being engageable with the interior of the small terminal end of the horn and being divided by a transversely disposed wall having a suitable hole, a semicircular reed block having a flat portion and a chamfer on the flat portion at one of its terminal ends, and having a rectilinearly disposed groove in the flat portion, a reed locking means and a reed. The reed locking means and reed are operable to closely, slidably engage the interior walls of the reed cylinder and to fit within the reed cylinder engaging end of the horn.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
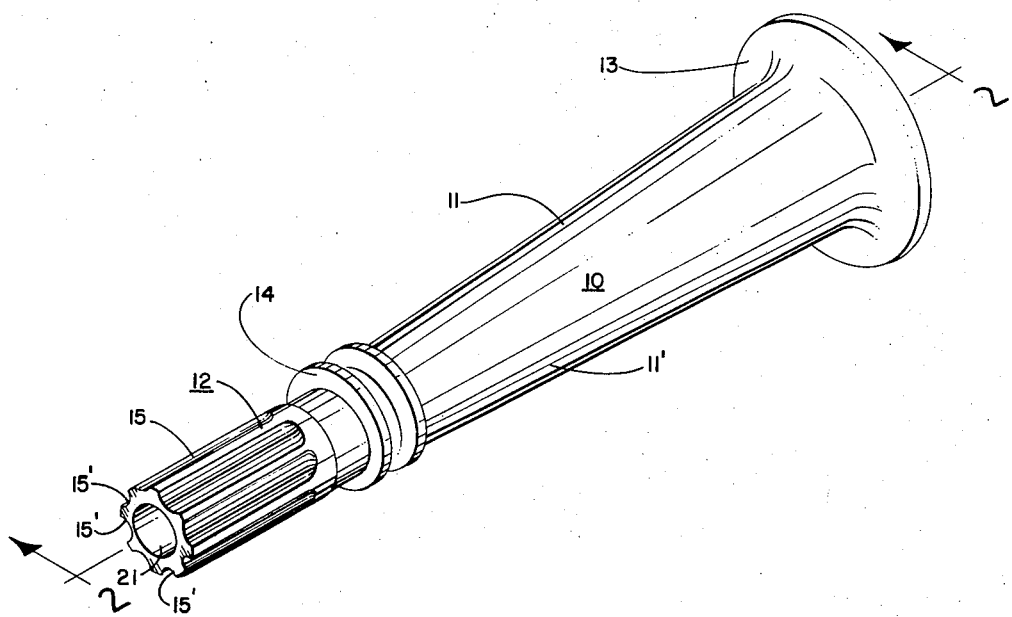
FIG. 1 is a left front perspective view of the wildlife call of this invention.
Figure 2:
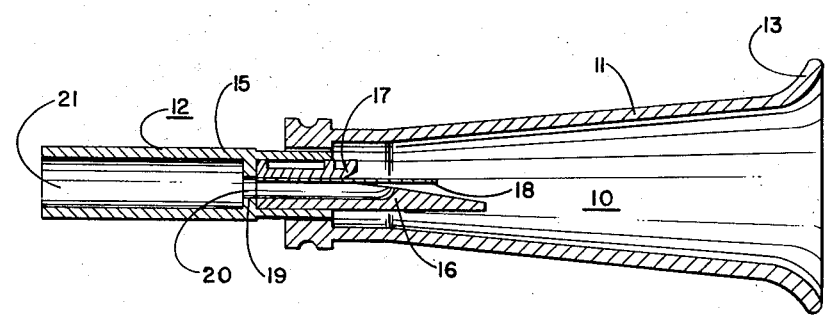
FIG. 2 is a cross-sectional view taken substantially along the lines 2—2 of the FIG. 1 showing the interior configuration thereof.

Referring now to the drawings and, more particularly, to the FIGS. 1 and 2, the wildlife call of this invention is shown to advantage and generally identified by the numeral 10. The wildlife call 10 comprises a horn 11 and a reed assembly 12. The horn 11 has a tapered hull cylinder 11' and an outwardly flared mouthpiece 13 at the wider terminal end of the cylinder 11'. The narrower end of the horn cylinder 11' is provided with integrally molded rings 14 which are operable to reinforce the end portion against expansive forces of the reed assembly 12.

Referring to the FIG. 2, the reed assembly 12 includes a reed cylinder 15, a reed block 16, a reed locking means 17, and a reed 18. The reed cylinder 15 provides a substantially hollow housing for the reed assembly 12. One of the terminal ends of the cylinder 15 is operable to closely, slidably engage the entrance-way of the narrow terminal end of the cylinder 11' of the horn 11. The reed cylinder 15 is divided transversely distally from its horn-engaging terminal end by a wall 19 which is provided with a hole 20 to permit passage of air in a manner hereinafter described. The wall 19 is operable to position the reed block 16 and the reed 18 a predetermined distance within the horn 11, and is operable to provide a resonant chamber 21 between the wall 19 and the terminal end of the cylinder 15 opposite the horn-engaging end. The exterior of the cylinder 15 is provided with gripping means, such as rectilinearly disposed indentations 15', to facilitate removal of the reed assembly 12 from the horn 11.

Figures 3, 4:
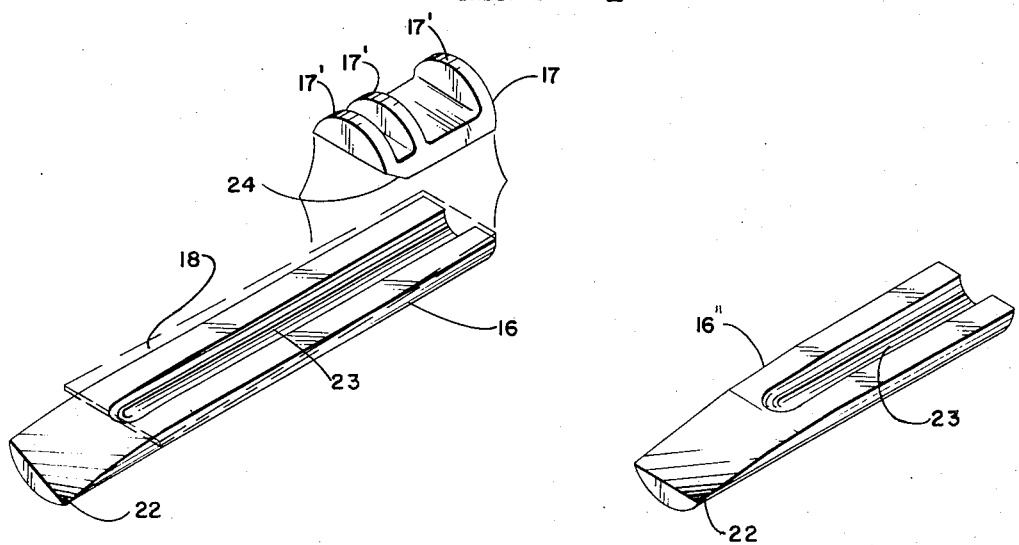
FIG. 3 is a right rear perspective view of the reed block with the reed block locking means exploded away for illustrative purposes, and showing a reed in broken lines for illustrative purposes.
FIG. 4 is a right rear perspective view of a further embodiment of the reed block.

The reed block 16 includes a substantially convexly configured side, closely conforming to the interior configuration of the chamber on the horn-engaging end of the cylinder 15, and a substantially flat portion 16' on which the reed 18 may lie. The reed block 16 also includes an inclined chamfer 22 at one of its terminal ends and a centrally, rectilinearly disposed groove 23 running the length of the flat portion 16'. In practice, it has been found to advantage to fabricate the reed block 16 in various sizes, according to the wildlife animal sound desired. The reed block 16, as shown in the FIG. 3, has a configuration which has a relatively long flat portion 16' with a chamfer 22 cambered transversely to one side for a relatively low pitch and a low frequency. In a further embodiment, shown in the FIG. 4, the reed block 16 has a relatively short flat portion 16' with a relatively long chamfer 22 cambered transversely to one side for a relatively high pitch.

Referring again to the FIG. 3, the locking means 17 includes a flat portion on one side and a convexly curved portion on the side opposite. The convexly curved portion may be formed by a plurality of suitably curved projections 17'. A camfer 24 is provided on one of the terminal ends on the flat reed-contacting side of the locking means 17. The locking means 17 is operable to lie with its flat side adjacent a reed 18 which is lying on the flat portion 16' of the reed block 16, the flat sided portion of the locking means 17 and the flat portion 16' of the reed block 16 being in alignment. The assembled reed block 16, the reed 18, and the locking means 17 may be slidably engaged into the chamber, on the horn-engaging side, of the reed cylinder 15 until the assembled elements contact the wall 19, as shown in the FIG. 2. The reed block 16 and the locking means 17 are fabricated to align the groove 23 with the hole 20 and to juxtaposition the transverse line of the reed 18 distally from one side of the hole 20.

Referring again to the FIG. 3, the locking means 17 is substantially shorter rectilinearly than the reed block 16. The reed 18 is held at one of its terminal ends between the reed block 16 and the locking means 17, and is substantially free-standing at its opposite terminal end. The reed 18 is permitted to move between the locking means chamfer 24 and the reed block chamfer 22.

Figures 5, 6:
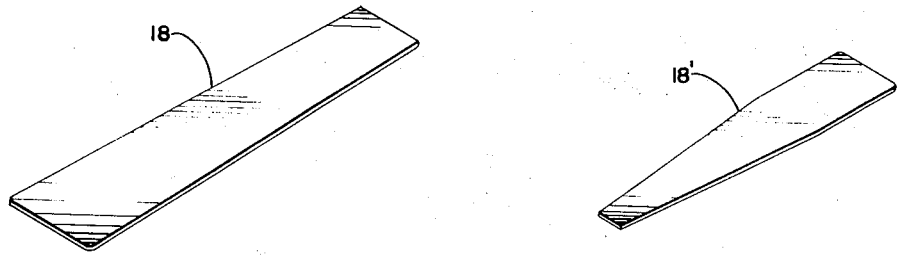
FIG. 5 is a top right rear perspective view of the reed.
FIG. 6 is a top right rear perspective view of a further embodiment of the reed.

Referring now to the FIG. 5, the reed 18 is a suitably thin and flat strip which may be tapered along its rectilinear sides substantially from one of its terminal ends to the other. The reed 18 may be made of any of a number of flexible reed materials, such as wood or plastic. A further embodiment of the reed 18, shown to advantage in the FIG. 6, is tapered relatively more from a point distally from one of its terminal ends on the rectilinear sides to produce a higher pitch and frequency. The wider portion of the reed 18 is suitable to closely conform to the interior terminal sides of the reed cylinder 15, when the reed 18 is positioned as set out above. It is to be understood that a variety of suitably configured reeds 18 may be interchangeably used to produce a corresponding range of wildlife sounds.

In operation, the wildlife call 10 with a suitable reed assembly 12, arranged as set out above, may be slidably engaged with the narrow end of the horn 11. The mouthpiece 13 of the horn 11 is placed against the operator's lips, and he may blow into the horn 11 to produce a sound. The operator may vary the pressure and vary the duration of the pressure impulses to imitate various wildlife sounds. In blowing, air passes between the reed block 16 and the reed 18 causing the free-standing portion of the reed 18 to vibrate within an audible frequency. The sound and air pressure passes through the hole 20 and resonates in the chamber 21.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A wildlife call comprising a substantially cylindrical horn and a reed assembly, said reed assembly including a reed cylinder operable to closely slidably engage one of the terminal ends of the interior of one of the terminal ends of said horn, a reed block having a convexly curved portion and a flat portion on the side opposite, said reed block having a chamfer in the said flat portion of one of the terminal ends of said block and having a centrally rectilinearly disposed groove, a reed locking means having a convexly curved portion, a flat portion and a chamfer on said flat portion at one of the terminal ends of said locking means, a suitably thin and flat reed, said reed being operable to lie on said flat portion of said reed block, said flat portion of said reed block being operable to lie on said reed with the ends opposite said chamfer of said reed block and said locking means adjacently aligned and aligned with one of the ends of said reed, and together being operable to closely slidably engage the interior terminal sides of said reed cylinder.

2. The apparatus of claim 1 wherein said reed is tapered along its terminal sides distally from one of its terminal ends to the end opposite, and wherein said reed is arranged with its widest terminal end disposed at said leading reed cylinder engaging end of said assembled reed, reed block and reed locking means.

3. The apparatus of claim 1 wherein said horn is tapered from its reed cylinder engaging end to the end opposite, and wherein said reed cylinder is suitably divided by a transversely disposed wall having a suitable hole.

4. The apparatus of claim 1 wherein said horn includes an outwardly projecting mouthpiece at the end opposite said reed cylinder engaging end.

* * * * *